US011866309B2

(12) United States Patent
Chalavon et al.

(10) Patent No.: US 11,866,309 B2
(45) Date of Patent: Jan. 9, 2024

(54) DOUBLE-REEVED LIFTING DEVICE WITH A ROTARY LOCKING MECHANISM

(71) Applicant: MANITOWOC CRANE GROUP FRANCE, Dardilly (FR)

(72) Inventors: Jonathan Chalavon, Mions (FR); Adrien Gourru, Lyons (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 0 days.

(21) Appl. No.: 17/478,835

(22) Filed: Sep. 17, 2021

(65) Prior Publication Data

US 2022/0081266 A1 Mar. 17, 2022

(30) Foreign Application Priority Data

Sep. 17, 2020 (FR) ...................................... 2009401

(51) Int. Cl.
*B66D 3/04* (2006.01)
*B66D 3/06* (2006.01)

(52) U.S. Cl.
CPC ............... *B66D 3/043* (2013.01); *B66D 3/06* (2013.01)

(58) Field of Classification Search
CPC . B66D 3/10; B66D 3/043; B66D 3/06; B66D 1/00; B66C 13/00; B66C 2700/017; B66C 23/88; B66C 23/62; Y10T 403/59; Y10T 403/597; Y10T 403/599; Y10T 403/70; Y10T 403/7015
USPC ........................................................ 254/399
See application file for complete search history.

(56) References Cited

U.S. PATENT DOCUMENTS 2,805,875 A * 9/1957 Modrey ................ F16B 19/109 411/80
2,973,942 A * 3/1961 Schaper .................. B66C 13/00 254/399
3,280,439 A * 10/1966 McCarthy .............. F16B 21/10 403/325

(Continued)

FOREIGN PATENT DOCUMENTS

DE 2114418 A1 * 10/1972 ............. B66D 3/043
DE 2845874 A1 4/1980

(Continued)

OTHER PUBLICATIONS

FR search report and written opinion issued by French Patent Office (INPI) dated May 27, 2021, in connection with corresponding FR Appl. 20/09401.

*Primary Examiner* — Michael R Mansen
*Assistant Examiner* — Henrix Soto
(74) *Attorney, Agent, or Firm* — Cook Alex Ltd.

(57) ABSTRACT

A double-reeved lifting device includes a lower reeve block secured to a lifting hook and an upper reeve block, wherein the two reeve blocks include reversible connection means adapted to be reversibly configured between a connected configuration and a disconnected configuration. The reversible connection means include a locking mechanism and a complementary locking structure respectively having at least one striker orifice and a bolt slidably movable and supporting a locking finger adapted to rotatably cooperate with the striker orifice, and respective guide elements cooperating together so as to convert a relative approach and a relative distancing between the two reeve blocks into concomitants slidings and rotations of the bolt.

19 Claims, 11 Drawing Sheets

(56) References Cited

U.S. PATENT DOCUMENTS

| | | | | | |
|---|---|---|---|---|---|
| 3,306,469 | A * | 2/1967 | Durand | B66D 3/043 |
| | | | | 212/102 |
| 4,927,286 | A * | 5/1990 | Hobluigie | F16D 3/387 |
| | | | | 403/322.2 |
| 4,943,182 | A * | 7/1990 | Hoblingre | F16D 1/108 |
| | | | | 403/328 |

FOREIGN PATENT DOCUMENTS

| | | | | | |
|---|---|---|---|---|---|
| DE | 3149690 | A1 | 6/1983 | |
| DE | 3543214 | A1 | 12/1986 | |
| FR | 1520612 | A | 4/1968 | |
| FR | 2131924 | A1 | 11/1972 | |
| FR | 2137333 | A1 | 12/1972 | |
| FR | 2228024 | A1 | 11/1974 | |
| FR | 2228024 | A1 * | 1/1975 | B66D 3/043 |
| FR | 2333743 | A1 | 7/1977 | |
| FR | 2368431 | A1 | 5/1978 | |
| FR | 2368431 | A1 * | 6/1978 | B66D 3/043 |
| FR | 3061164 | A1 * | 6/2018 | B66D 3/043 |
| GB | 2176456 | A * | 12/1986 | B66D 3/043 |
| GB | 2176456 | A | 12/1986 | |
| IT | MI20101302 | A1 * | 1/2012 | B66D 3/043 |
| IT | MI20101302 | A1 | 1/2012 | |

* cited by examiner

DOUBLE-REEVED LIFTING DEVICE WITH A ROTARY LOCKING MECHANISM

FIELD

The present disclosure relates to a double-reeved lifting device for a lifting machinery, as well as a lifting machinery and a lifting method associated thereto.

The present disclosure finds an application, yet without limitation, for a lifting machinery such as a crane, and in particular a tower crane.

BACKGROUND

In a known manner, a double-reeved lifting device is adapted to be reversibly configured between two reeving configurations including a simple-reeved configuration with two lifting strands and a double-reeved configuration with four lifting strands, wherein the double-reeved lifting device comprises a reeving change system to perform a change of reeving between the simple-reeved configuration and the double-reeved configuration.

Conventionally, such a double-reeved lifting device comprises two reeve blocks, namely a lower reeve block secured to a lifting hook and an upper reeve block, and these two reeve blocks comprise reversible connection means adapted to be reversibly configured between:

- a connected configuration in which the upper reeve block is connected to the lower reeve block so as to be able to accompany it in ascending/descending movements, and
- a disconnected configuration in which the upper reeve block is disconnected from the lower reeve block so as to be able to remain hanging above the lower reeve block which could perform descending/ascending movements without the upper reeve block.

The lower reeve block is hanging from the lifting machinery by a lifting rope connected to a lifting winch to make the lower reeve block ascend/descend, and this lifting rope passes through the upper reeve block, so that the connected configuration and the disconnected configuration respectively correspond to a double-reeved configuration and to a simple-reeved configuration, or vice versa, of the double-reeved lifting device, depending on the passage of the lifting rope at the level of the upper reeve block.

For example, the documents FR 1 520 612, FR 2 137 333, FR 2 368 431, FR 2 131 924, FR 2 228 024 describe double-reeved lifting devices in which the connected configuration corresponds to the double-reeved configuration, and the disconnected configuration corresponds to the simple-reeved configuration; the lifting rope passing under a pulley carried by the upper reeve block.

And conversely, the documents GB 2 176 456, FR 2 333 743, DE 31 49 690, DE 35 43 214 describe double-reeved lifting devices in which the connected configuration corresponds to the simple-reeved configuration, and the disconnected configuration corresponds to the double-reeved configuration; the lifting rope passing above a pulley carried by the upper reeve block.

However, the reversible connection means known in this prior art to connect/disconnect the two reeve blocks, are barely satisfactory. Indeed, some of them involve numerous parts which become loose, reduce the reliability of the mechanism and require a lot of maintenance, not to mention the high manufacturing costs, others require accessories to activate actuators located in general at the root of the jib, which limits the possibilities of replacement of the reeving at the root of the jib, posing an accessibility problem if the latter is in an inaccessible area of the work site, other still require manual operations on the ground for connecting/disconnecting the reeve blocks which might turn out to be dangerous if they are badly performed, and which are time-consuming.

SUMMARY

The present disclosure aims at solving at least part of the aforementioned drawbacks, by providing a double-reeved lifting device equipped with robust reversible connection means that are reliable over time, and which does not need any part fastened on the jib to allow performing a reeving change, so that it is possible to perform such a reeving change irrespective of the span or location of the lower reeve block along the jib.

The present disclosure also aims at providing reversible connection means equipped with a locking mechanism with movable parts mounted only on one of the two reeve blocks, the other reeve block comprising no movable parts for the connection/disconnection of the two reeve blocks, which may be advantageous in terms of maintenance and reliability.

The present disclosure also aims at reducing the bulk of the lifting device, in particular in the double-reeved configuration in order to enhance the capability of displacement along the jib.

The present disclosure also aims at providing a double-reeved lifting device allowing switching automatically, without any manual intervention, from the double-reeved configuration into the simple-reeved configuration, and vice versa, in a reliable, rapid and reproducible way over time.

Thus, the present disclosure provides a double-reeved lifting device for a lifting machinery, such as for example a crane, comprising two reeve blocks, namely a lower reeve block secured to a lifting hook and an upper reeve block, wherein the two reeve blocks comprise reversible connection means adapted to be reversibly configured between:

- a connected configuration in which the upper reeve block is connected to the lower reeve block so as to be able to accompany it in ascending/descending movements, and
- a disconnected configuration in which the upper reeve block is disconnected from the lower reeve block so as to be able to remain hanging above the lower reeve block which could perform descending/ascending movements without the upper reeve block, wherein the connected configuration and the disconnected configuration respectively correspond to a double-reeved configuration and to a simple-reeved configuration, or vice versa, of the double-reeved lifting device, said double-reeved lifting device being characterized in that the reversible connection means comprise a locking mechanism mounted on one of the two reeve blocks, and a complementary locking structure mounted on the other one of the two reeve blocks and adapted to cooperate with the locking mechanism;

wherein the complementary locking structure comprises a set forming a striker having at least one striker orifice, and the locking mechanism comprises a bolt mounted slidably movable along a spindle along a main axis and comprising at least one locking finger, wherein the bolt is also pivotally movable around the spindle and the main axis between:

- a locking state, applied in the connected configuration, with the locking finger inside the considered striker orifice, and an unlocking state, applied in the disconnected configuration, with the locking finger out of the considered striker orifice so as to enable a relative approach and a relative distancing between the two reeve blocks, and wherein the locking mechanism and the complementary locking structure comprise respective guide elements, cooperating together so as to convert a relative approach and a relative distancing between the two reeve blocks into concomitant slidings and rotations of the bolt.

Thus, embodiments of the present disclosure provides reversible connection means which are configured so as to convert ascending/descending movements of the lower reeve block (vertical translational movements) into rotational movements of the bolt, which will allow connecting/disconnecting the two reeve blocks easily, and that being so in a safe and reliable manner since few movable parts are necessary, only the bolt being movable, and also which will allow performing reeving change kinematics only thanks to the lifting movement allowing the rise/descent of the lower reeve block.

Thus, it should be noted that the bolt switches from a locking state into an unlocking state by performing a locking rotation, and switches from an unlocking state into a locking state by performing an unlocking rotation, wherein it is the rise/descent of the lower reeve block that will enable pivoting of the bolt.

Moreover, the connection/disconnection phases can be easily automated, since all it needs is to control the ascending/descending movements of the lower reeve block (by simply controlling the lifting movement, such as for example by controlling the motor-driven system of the lifting winch) to switch from a disconnected configuration into a connected configuration, and vice versa.

It should also be noted that the present disclosure allows performing a reeving change without the need for a part fastened on the jib, because the reversible connection means are integrated to the two reeve blocks, thereby allowing performing a reeving change anywhere along the jib.

In an embodiment, the complementary locking structure comprises a catch against which the bolt could abut during a relative approach between the two reeve blocks for a sliding of the bolt in a first sliding direction, and the locking mechanism comprises an elastic biasing element, such as for example a spring, urging the bolt to slide in a second sliding direction, opposite to the first sliding direction.

Thus, all it needs is to lift/lower the lower reeve block for the bolt to abut, or not, against this catch, with the elastic biasing element which acts against a push exerted by the catch on the bolt, which makes the movements more reliable and allows for simple maneuvers during the connection/disconnection phases.

According to one feature, the guide elements comprise complementary guide elements provided on the locking mechanism so as to cooperate in sliding bearing in order to convert a sliding of the bolt in the first sliding direction into a concomitant first rotation of the bolt, and a sliding of the bolt in the second sliding direction into a concomitant second rotation of the bolt.

Thus, when the bolt slides (by the action of the catch or of the elastic biasing element), the latter concomitantly pivots so as to engage with the set forming the striker or to disengage from the set forming the striker. In this embodiment, it should be noted that the locking rotation is decomposed into a combination of the first rotation and of the second rotation and, similarly, the unlocking rotation is also decomposed into a combination of the first rotation and of the second rotation.

According to one variant, the locking rotation is performed in one single rotation and, similarly, the unlocking rotation is also performed in one single rotation.

According to one possibility, the first rotation and the second rotation are performed in the same rotational direction.

Thus, all it needs is to successively perform the first rotation and then the second rotation, and therefore successively perform sliding of the bolt in the first sliding direction and then in the second sliding direction, to make the bolt switch from a locking state into an unlocking state, and vice versa.

According to one variant, the first rotation and the second rotation are performed in opposite rotational directions.

According to another possibility, a sequence of the first rotation and of the second rotation leads to an overall rotation of the bolt at an overall angular amplitude that is equivalent to 90 degrees or to 90 degrees plus N times 180 degrees, N being an integer other than zero.

Thus, a sequence of the first rotation and then of the second rotation leads to a pivoting of the bolt by 90 degrees, or by 270 degrees, . . . , so that the bolt lies orthogonally.

Advantageously, the first rotation is performed at a first angular amplitude and the second rotation is performed at a second angular amplitude, wherein each of the first angular amplitude and the second angular amplitude are equivalent to 45 degrees.

In general, the combination of the first angular amplitude and of the second angular amplitude leads to an overall angular amplitude that is equivalent to 90 degrees or to 90 degrees plus N times 180 degrees, N being an integer other than zero.

According to an embodiment, the locking mechanism comprises:

- the spindle extending along the main axis and provided with a free end having a stop for the bolt;
- the bolt mounted rotatably and slidably movable around the spindle along the main axis, said bolt comprising the at least one locking finger extending transversely with respect to the main axis, wherein the bolt has a distal end facing the stop, and a proximal end opposite to the distal end; and
- the elastic biasing element mounted on the spindle and bearing on the proximal end of the bolt to slidably urge it in the direction of the stop in the second sliding direction;
- wherein the complementary locking structure comprises a locking housing in which are provided:
- the catch against which the distal end of the bolt could abut upon a relative approach between the two reeve blocks, urging the bolt to slide in the direction of a complementary proximal guide element in the first sliding direction, against the elastic biasing element; and
- the set forming the striker having the at least one striker orifice; and wherein the complementary guide elements comprise:
- at least one proximal guide element provided on the proximal end of the bolt and at least one complementary proximal guide element provided on the spindle so as to cooperate in sliding bearing with the proximal guide element in order to convert a sliding of the bolt in the direction of the complementary proximal guide element in the first sliding direction into the concomitant first rotation of the bolt, upon a relative approach between the two reeve blocks;

at least one distal guide element provided on the distal end of the bolt and at least one complementary distal guide element provided on the spindle so as to cooperate in sliding bearing with the distal guide element in order to convert a displacement of the bolt in the direction of the stop and of the complementary distal guide element in the second sliding direction into the concomitant second rotation of the bolt, by the effect of the elastic biasing element upon a relative distancing between the two reeve blocks.

According to one feature, the locking housing has a bottom wall in which an opening is formed for the passage of the free end of the spindle and of its stop, said opening being delimited by a periphery forming the catch.

According to another feature, the set forming the striker comprises at least one lateral flange delimiting the locking housing and in which the striker orifice is provided.

According to one variant, the lateral flange extends parallel to the main axis.

According to one possibility, the bolt comprises two locking fingers, diametrically facing each other along the main axis, and the set forming the striker comprises two lateral flanges facing each other, disposed on either side of the catch, and in which two respective striker orifices are provided facing each other.

According to another possibility, the bolt comprises:

an inner part mounted around the spindle and on which the at least one distal guide element and the at least one proximal guide element are provided; and an outer sleeve which surrounds the inner part and from which the at least one locking finger projects, wherein the elastic biasing element bears on said outer sleeve.

Thus, the outer sleeve protects the inner part including the distal and proximal guide elements thereof.

Advantageously, the at least one locking finger is fastened to the inner part and crosses the outer sleeve.

In other words, the locking finger(s) is or are fastened to the inner part and cross(es) the outer sleeve.

In an embodiment, the at least one proximal guide element comprises several proximal ramps successively distributed around the main axis on the proximal end of the bolt, and the at least one complementary proximal guide element comprises one or several proximal dowel pin(s) projecting radially on the spindle in order to slidably bear on one of the proximal ramps.

Similarly, the at least one distal guide element comprises several distal ramps successively distributed around the main axis on the proximal end of the bolt, and the at least one complementary distal guide element comprises one or several distal dowel pin(s) projecting radially on the spindle in order to slidably bear on one of the distal ramps.

According to one possibility, the proximal ramps and the distal ramps are inclined in opposite directions around the main axis, so that the first rotation and the second rotation of the bolt is performed in the same rotational direction, during the conversions of the slidings of the bolt in the first sliding direction and the second sliding direction respectively.

According to another possibility, the at least one locking finger extends orthogonally to the main axis, and the at least one striker orifice comprises a first oblong section along a direction perpendicular to the main axis and perpendicular to the locking finger in the locking state.

Such a first oblong section assists in the angular displacement of the locking finger(s).

According to another possibility, the at least one striker orifice comprises a second oblong section along a direction parallel to the main axis, disposed at the middle of the first oblong section.

Such a second oblong section allows following the bolt, and therefore the locking finger(s), during sliding of the bolt.

The present disclosure also relates to a lifting machinery, such as for example a crane, comprising a jib and a double-reeved lifting device formed so as to lift/lower a load along the jib, said double-reeved lifting device being in accordance with the embodiments herein, wherein the lower reeve block hangs from the jib by a lifting rope connected to a lifting winch to make the lower reeve block ascend/descend, this lifting rope passing through the upper reeve block, and wherein:

starting from the disconnected configuration with the upper reeve block hanging above the lower reeve block and with the bolt in the unlocking state, said lower reeve block could be displace so that the respective guide elements cooperate together so as to make the bolt slide and pivot concomitantly in order to set it into the locking state to reach the connected configuration; and starting from the connected configuration with the bolt in the locking position, said lower reeve block could be displaced so that the respective guide elements cooperate together so as to make the bolt slide and pivot concomitantly in order to set it into the unlocking state to reach the disconnected configuration.

To the extent that the lifting winch allows making the lower reeve block ascend/descend, then the change in the configuration between the connected configuration and the connected configuration (and therefore between the double-reeved configuration and the simple-reeved configuration) take place only when controlling the lifting winch.

In one embodiment:

starting from the disconnected configuration, the lower reeve block could be raised for a relative approach between the two reeve blocks until the upper reeve block reaches the high stop on the jib and the bolt abuts against the catch in order to make the bolt slide in the first sliding direction and make it pivot concomitantly into the first rotation of the bolt, and then said lower reeve block could be lowered so that said bolt slides in the second sliding direction urged by the elastic biasing element and concomitantly pivots into the second rotation of the bolt, thereby setting the bolt in the locking state; and starting from the connected configuration, said lower reeve block could be raised until the upper reeve block reaches the high stop on the jib and the bolt abuts against the catch in order to make the bolt slide in the first sliding direction and make it pivot concomitantly into the first rotation of the bolt, and then said lower reeve block could be lowered so that said bolt slides in the second sliding direction urged by the elastic biasing element and concomitantly pivots into the second rotation of the bolt, thereby setting the bolt in the unlocking state.

Advantageously, the lifting machinery comprises a dispensing carriage movably mounted on the jib and linked to a dispensing system adapted to displace the dispensing carriage along the jib in opposite forward direction and backward direction, and wherein the lower reeve block hangs from said dispensing carriage by the lifting rope.

The present disclosure also relates to a method for lifting a load in a lifting machinery, comprising:

a connection phase for a switch from the disconnected configuration into the connected configuration, during which the lower reeve block is displaced so that the respective guide elements cooperate together to make the bolt slide and pivot concomitantly in order to set it in the locking state to reach the connected configuration; and a disconnection phase for a switch from the connected configuration into the disconnected configuration, during which the lower reeve block is displaced so that the respective guide elements cooperate together so as to make the bolt slide and pivot concomitantly in order to set it in the unlocking state to reach the disconnected configuration.

In an embodiment:

starting from the disconnected configuration, said lower reeve block may be raised for a relative approach between the two reeve blocks until the upper reeve block reaches the high stop on the jib and the bolt abuts against the catch in order to make the bolt slide in the first sliding direction and make it pivot concomitantly into the first rotation of the bolt, and then said lower reeve block may be lowered so that said bolt slides in the second sliding direction urged by the elastic biasing element and concomitantly pivots into the second rotation of the bolt, thereby setting the bolt in the locking state; and starting from the connected configuration, said lower reeve block may be raised until the upper reeve block reaches the high stop on the jib and the bolt abuts against the catch in order to make the bolt slide in the first sliding direction and make it pivot concomitantly into the first rotation of the bolt, and then said lower reeve block may be lowered so that said bolt slides in the second sliding direction urged by the elastic biasing element and concomitantly pivots into the second rotation of the bolt, thereby setting the bolt in the unlocking state.

The displacements of the lower reeve block, in the connection phase and in the disconnection phased, are automated.

According to one variant, in the connection phase and in the disconnection phase, the displacements of the lower reeve block are driven at a reduced speed, below a predefined speed threshold.

BRIEF DESCRIPTION OF THE DRAWINGS

Other features and advantages of the present disclosure will appear upon reading the detailed description hereinafter, of a non-limiting example of implementation, made with reference to the appended figures in which.

DESCRIPTION

Figure 1:
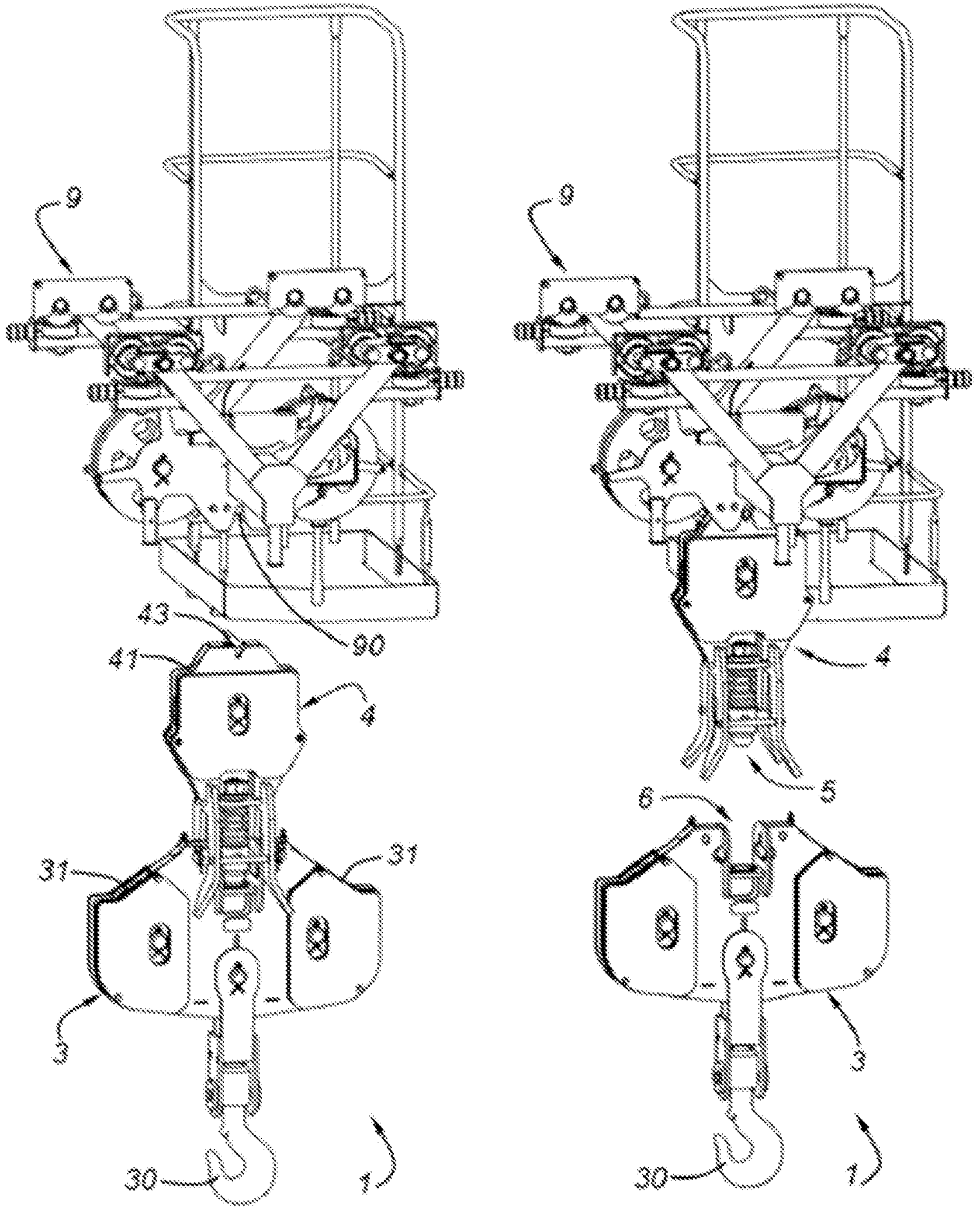
FIG. 1 is a schematic perspective view of a double-reeved lifting device according to an embodiment, when hanging from a dispensing carriage, in a connected configuration (to the left) and in a disconnected configuration (to the right)

Referring to FIG. 1, a double-reeved lifting device 1 according to an embodiment is provided for a lifting machinery, such as for example a crane, which has a jib (not illustrated) and a dispensing carriage 9 movably mounted on the jib and linked to a dispensing system adapted to displace the dispensing carriage 9 along the jib in opposite forward direction and backward direction; this dispensing system consisting for example of a dispensing winch which cooperates with a dispensing rope for the displacement of the dispensing carriage 9.

This double-reeved lifting device 1 comprises two reeve blocks 3, 4, namely:

a lower reeve block 3 secured to a lifting hook 30 intended to hook a load, wherein the lower reeve block 3 hangs from the dispensing carriage 9 (and therefore hangs from the jib) by a lifting rope (not illustrated) connected to a lifting winch so as to make the lower reeve block 3 rise/descend; and an upper reeve block 4 through which the lifting rope passes, the upper reeve block 4 also hanging from the dispensing carriage 9.

Also, the lower reeve block 3 supports lower rope deflecting means, and the upper reeve block 4 supports upper rope deflecting means, such as for example a pulley 41, for the passage of the lifting rope. Thus, the double-reeved lifting device 1 is formed so as to lift/lower a load along the jib of the lifting machinery.

The two reeve blocks 3, 4 are equipped with reversible connection means adapted to be reversibly configured between:

- a connected configuration (illustrated in FIG. 1 to the left) in which the upper reeve block 4 is connected to the lower reeve block 3 so as to be able to accompany it in ascending/descending movements along a main axis having a vertical extension, and
- a disconnected configuration (illustrated in FIG. 1 to the right) in which the upper reeve block 4 is disconnected from the lower reeve block 3 so as to be able to remain hanging above the lower reeve block 3 which could perform descending/ascending movements alone without the upper reeve block 4.

Depending on the passage of the lifting rope in the lower rope deflecting means provided on the lower reeve block 3 and in the upper rope deflecting means provided on the upper reeve block 4, the connected configuration and the disconnected configuration respectively correspond to a double-reeved configuration and to a simple-reeved configuration, or vice versa, of the double-reeved lifting device 1; the simple-reeved configuration being associated to holding of the hook 30 (and therefore of the load) by two lifting strands of the lifting rope, and the double-reeved configuration being associated to holding of the hook 30 (and therefore of the load) by four lifting strands of the lifting rope.

The reeve block 4 supports, at the upper portion thereof, an upper stop 43 adapted to abut against the dispensing carriage 9, when the upper reeve block 4 is at the high stop on the jib, alone without the lower reeve block 3. For this purpose, and as shown in FIG. 1, a slot 90 is provided, on the underside of the dispensing carriage 9, into which the upper stop 43 fits and abuts.

The reversible connection means comprise a locking mechanism 5 mounted on the upper reeve block 4, and a complementary locking structure 6 mounted on the lower reeve block 3 and adapted to cooperate with the locking mechanism 5.

Figure 8:
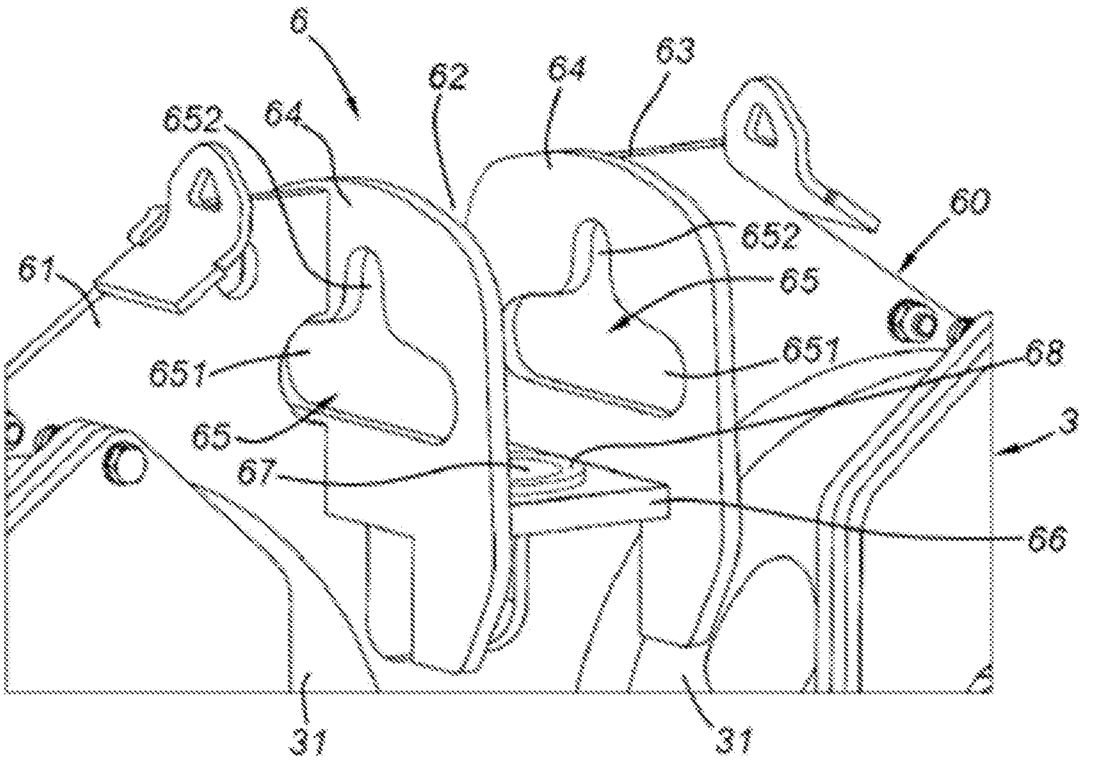
FIG. 8 is a schematic partial and perspective view of the lower reeve block, with one flange removed for clarity.

Referring to FIG. 8, the complementary locking structure 6 is part of the lower reeve block 3 and it is provided above the lower rope deflecting means, and therefore above the two pulleys 31 in the illustrated example. This complementary locking structure 6 comprises a frame 60 having two walls 61 facing each other (only one wall 61 is shown in FIG. 8) and in which there is provided a locking housing 62 open onto the top of the lower reeve block 3, opposite the upper reeve block 4. It should be noted that the two pulleys 31 are mounted between the walls 61.

The locking housing 62 is in the form of an elongate-configured groove along the main axis (and therefore along a vertical direction), opening onto an upper sear 63 of the frame 60.

This frame 60 comprises a set forming a striker provided with two lateral flanges 64 facing each other, extending parallel to the main axis (and therefore along a vertical direction) and orthogonal to the walls 61, wherein these two lateral flanges 64 laterally delimit the locking housing 62. Striker orifices 65 are formed facing each other in the respective lateral flanges 64, so that this set forming the striker has two striker orifices 65 facing each other.

This frame 60 also comprises a bottom wall 66 in which an opening 67 is formed delimited by a periphery forming a catch 68. This bottom wall 66 extends between the two lateral flanges 64, orthogonal to the main axis. Thus, the two lateral flanges 64 are disposed on either side of this catch 68.

Each striker orifice 65 has an inverted «T»-like general shape, and comprises a first oblong section 651 along a direction perpendicular to the main axis, and a second oblong section 652 along a direction parallel to the main axis, disposed at the middle of the first oblong section 651; wherein this second oblong section 652 extends upwards (in the direction of the upper reeve block 4) from the middle of the first oblong section 651.

Referring to FIGS. 2-7, the locking mechanism 5 is part of the upper reeve block 4 and there are provided upper rope deflecting means beneath it, and therefore under the pulley 41 in the illustrated example. This locking mechanism 5 comprises:

- a spindle 50 fixedly mounted on the upper reeve block 4 extending along the main axis and provided with a free end having a stop 51 with an enlarged section;
- a bolt 52 mounted slidably movable around the spindle 50 along the main axis and also pivotally movable around the spindle 50 and the main axis, wherein this bolt 52 is disposed above the stop 51 which therefore forms a stop for the bolt 52;
- an elastic biasing element 53 mounted on the spindle 50 and urging the batt 62 bolt 52 to slide in the direction of the stop 51.

The bolt 52 has a distal end 521 facing the stop 51, and a proximal end 522 opposite to the distal end 521. The elastic biasing element 53 is in the form of a spring mounted around the spindle 50 and bearing on this proximal end 522 of the bolt 52 to urge it to slide in the direction of the stop 51 along a sliding direction called second sliding direction later on (sliding downwards in the illustrated example).

Figure 2:
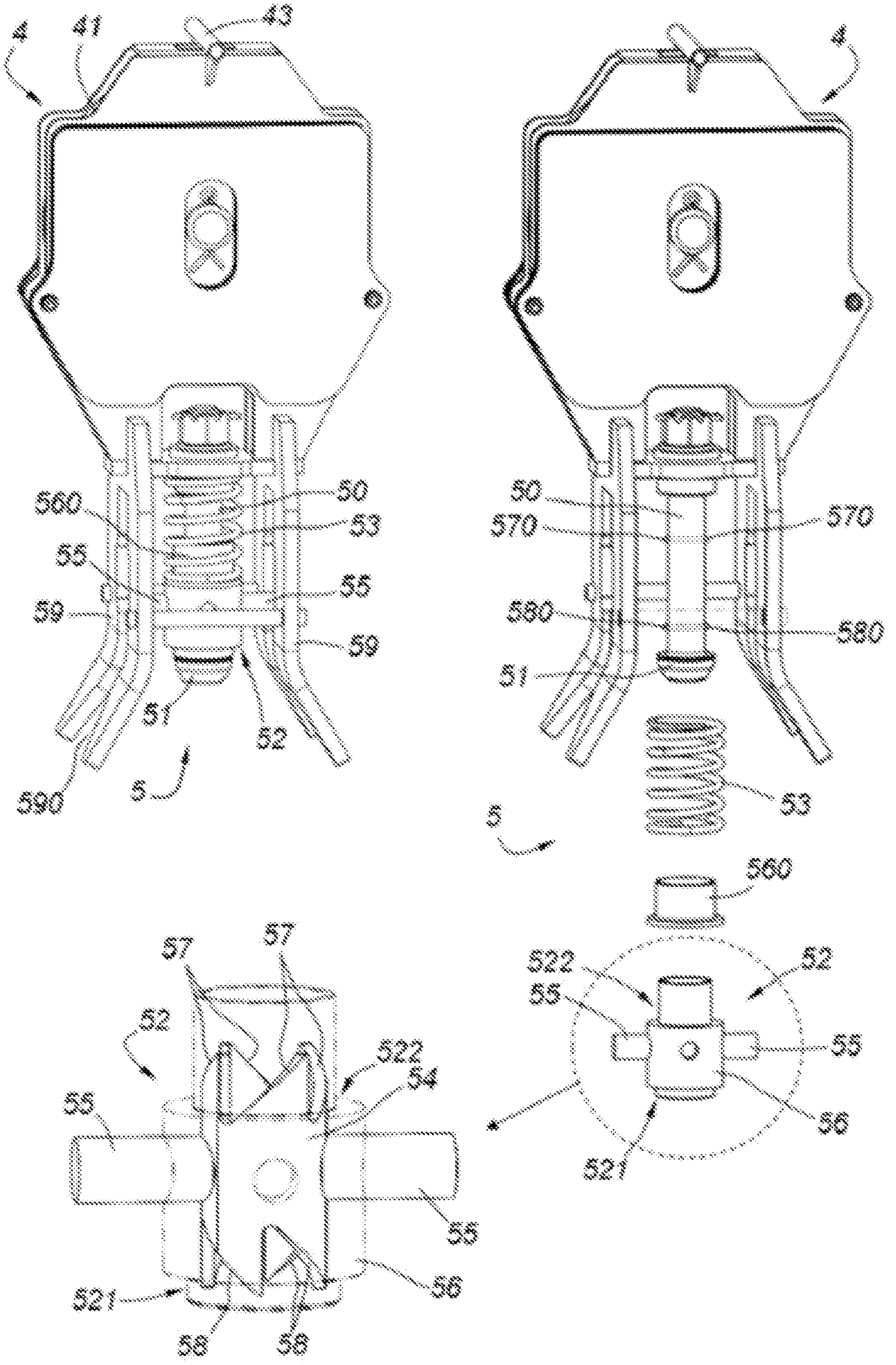
FIG. 2 is a schematic perspective view of an upper reeve block of the double-reeved lifting device of FIG. 1, in a non-exploded version (to the left) and in an exploded version (to the right) with zooming on the bolt to the bottom.
Figure 3:
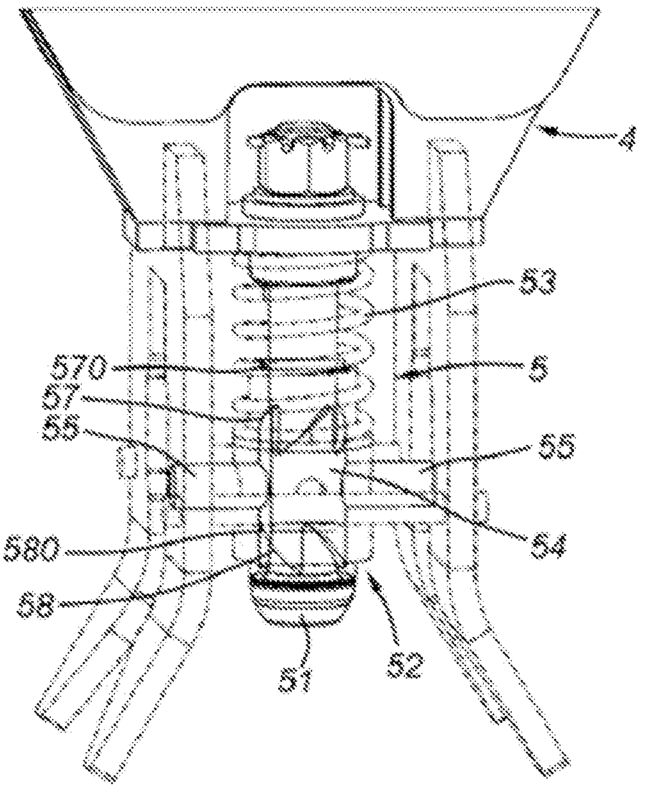
FIG. 3 is a schematic partial and perspective view of the upper reeve block, with some elements in transparency and with the bolt in the unlocking state.
Figure 4:
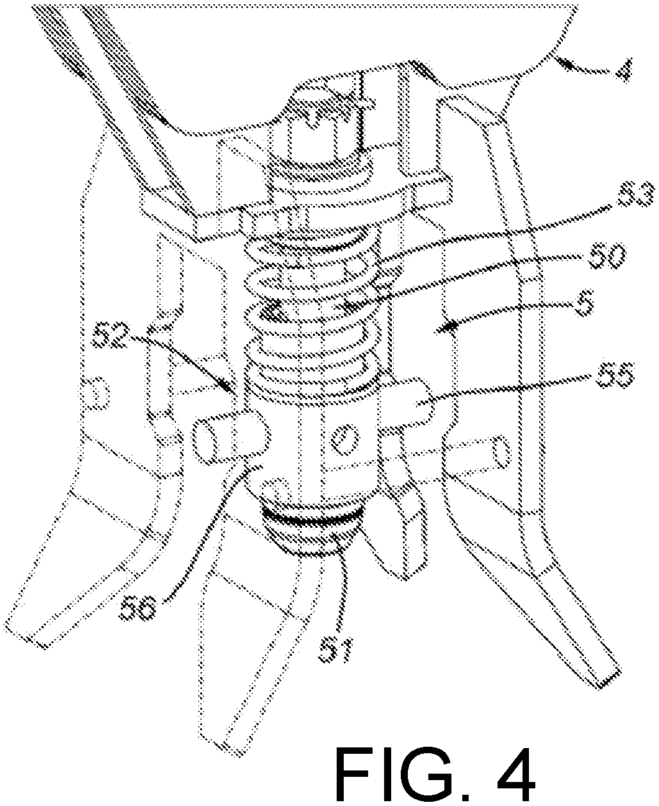
FIG. 4 is a schematic partial and perspective view of the upper reeve block, with some elements in transparency and with the bolt in the locking state, at another viewpoint different from FIG. 3.

Referring to FIG. 2, the bolt 52 comprises a cylindrical-configured inner part 54, mounted around the spindle 50 and adapted to slide along the spindle 50 and to rotate around the spindle 50. This inner part 54 supports two locking fingers 55 extending transversely with respect to the main axis, and more specifically orthogonally to the main axis. The two locking fingers 55 are diametrically opposite one another with respect to the main axis. The bolt 52 also comprises an outer sleeve 56 which surrounds the inner part 54, wherein the two locking fingers 55 cross the outer sleeve 56 before projecting outwardly from this outer sleeve 56. It should be noted that the elastic biasing element 53 bears on this outer sleeve 56, via a cap 560. Each of the two locking fingers 55 may consist of a rod crossing both the outer sleeve 56 and the inner part 54, yet without fitting into the spindle 50 in order not to hinder sliding and rotation of the bolt 52 around the spindle 50.

It should be noted that the set comprising the spindle 50 and the bolt 52 is adapted to fit inside the locking housing 62 of the complementary locking structure 6 during a relative approach between the two reeve blocks 3, 4, until the stop 51 fits inside the opening 67 provided in the bottom wall 66 and then the distal end 521 of the bolt 52 abuts against the periphery of the opening forming the catch 68 and thus the bolt 52 slides in a first sliding direction (sliding upwards in the illustrated example) by the effect of the push exerted by the catch 68. Also, it should be noted that the opening 67 is sized for the passage of the free end of the spindle 50 and of its stop 51.

Conversely, the absence of such a push exerted by the catch 68 on the bolt 52, and therefore during a relative spacing between the two reeve blocks 3, 4, the elastic biasing element 53 urges the bolt 52 to slide in the second sliding direction (for recall, sliding downwards in the illustrated example), opposite to the first sliding direction.

Moreover, the locking mechanism 5 comprises complementary guide elements intended to cooperate in sliding bearing in order to: convert a sliding of the bolt 52 in the first sliding direction into a concomitant first rotation of the bolt 52, and

- convert a sliding of the bolt 52 in the second sliding direction, opposite to the first sliding direction, into a concomitant second rotation of the bolt 52.

These complementary guide elements comprise the following means configured so as to convert a sliding of the bolt 52 in the first sliding direction into a concomitant first rotation of the bolt 52:

- several proximal ramps 57 formed on the inner part 54, at the level of the proximal end 522 of the bolt 52, and more specifically on a proximal peripheral edge (directed upwards in the illustrated example) of the inner part 54, wherein these proximal ramps 57 are successively distribute around the main axis and form proximal guide elements; and
- two proximal dowel pins 570 projecting radially on the spindle 50, disposed facing the proximal end 522 of the bolt 52 (and therefore disposed above the bolt 52 in the illustrated example), wherein these proximal dowel pins 570 form complementary proximal guide elements configured so as to slidably bear on the proximal ramps 57 when the bolt 52 slides in the first sliding direction, so that the proximal ramps 570 will slip along the proximal dowel pins 570 and will thus make the bolt 52 rotate into the first rotation.

These complementary guide elements comprise the following means configured so as to convert a sliding of the bolt 52 in the second sliding direction into a concomitant second rotation of the bolt 52:

- several distal ramps 58 formed on the inner part 54, at the level of the distal end 521 of the bolt 52, and more specifically on a distal peripheral edge (directed downwards in the illustrated example) of the inner part 54, wherein these distal ramps 58 are successively distribute around the main axis and form distal guide elements; and
- two distal dowel pins 580 projecting radially on the spindle 50, disposed facing the distal end 521 of the bolt 52 (and therefore disposed under the bolt 52 in the illustrated example), wherein these distal dowel pins 580 form complementary distal guide elements configured so as to slidably bear on the distal ramps 58 when the bolt 52 slides in the second sliding direction, so that the distal ramps 58 will slip along the distal dowel pins 580 and will thus make the bolt 52 rotate into the second rotation.

It should be noted that the shapes, dimensions and positioning of the proximal ramps 57, of the distal ramps 58, of the proximal dowel pins 570 and of the distal dowel pins 580, are such that the first rotation and the second rotation are performed in the same rotational direction, and that the first rotation is performed at a first angular amplitude of 45 degrees and the second rotation is performed at a second angular amplitude of 45 degrees. Also, a sequence of the first rotation and of the second rotation leads to an overall rotation of the bolt 52 at an overall angular amplitude that is equivalent to 90 degrees.

Thus, it is provided that the proximal ramps 57 and the distal ramps 58 are inclined in opposite directions around the main axis, so that the first rotation and the second rotation of the bolt 52 are performed in the same rotational direction. Moreover, each of the proximal ramps 57 and distal ramps 58 defines saw teeth-like profiles on the respective proximal and distal peripheral edges of the inner part 54, with ridges (in the form of tips) and valleys.

As it will be described later on, the bolt 52 is pivotally movable around the spindle 50 and the main axis between:

- a locking state (shown in FIGS. 2-5), applied in the connected configuration, in which the locking fingers 55 are adapted to extend inside the considered striker orifices 65, and
- an unlocking state (shown in FIGS. 6 and 7), applied in the disconnected configuration, in which the locking fingers 55 are adapted to extend out of the considered striker orifices 65 so as to enable a relative approach and a relative spacing between the two reeve blocks 3, 4.

In the unlocking state, the locking fingers 55 extend parallel to the lateral flanges 64, so that the set comprising the spindle 50 and the bolt 52 could fit inside the locking housing 62 (upon a relative approach between the two reeve blocks 3, 4), and conversely could leave the locking housing 62 (upon a relative spacing between the two reeve blocks 3, 4), without the locking fingers 55 abutting against the lateral flanges 64.

In the locking state, the locking fingers 55 have pivoted by 90 degrees around the main axis, in comparison with the unlocking state, so that the locking fingers 55 could fit through the considered striker orifices 65 which are provided in the lateral flanges 64.

Thus, the complementary guide elements (proximal ramps 57, distal ramps 58, proximal dowel pins 570 and distal dowel pins 580), as well as the catch 68 and the elastic biasing element 53 together form respective guide elements to convert a relative approach and a relative spacing between the two reeve blocks 3, 4, into concomitant slidings and rotations of the bolt 52, to make this bolt 52 switch from a locking state into an unlocking state, and vice versa, and therefore to switch from a connected configuration into a disconnected configuration, and vice versa.

Figure 10:
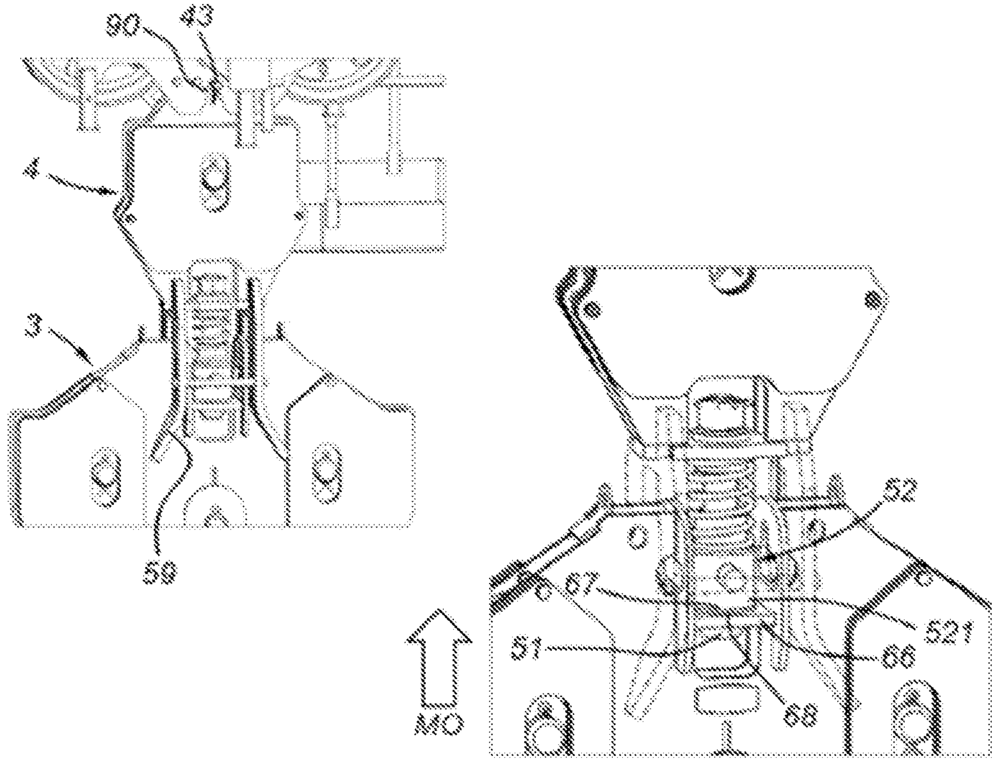
FIG. 10 is a schematic view equivalent to that of FIG. 9, at the beginning of a first step of a disconnection phase which follows the disconnected configuration of FIG. 9, during which the lower reeve block is mounted until the bolt abuts against the catch.

The locking mechanism 5 also comprises two slit walls 59, disposed on either side of the spindle 50, each having a slot open at the bottom (facing the lower reeve block 3), with a flared mouthpiece 590 adapted so that the frame 60 fits inside the slots of these slit walls 59 upon a relative approach between the two reeve blocks 3, 4 (as shown in FIG. 10), thereby promoting a centering of the spindle 50 and of the bolt 52 with the locking housing 62 of the complementary locking structure 6.

The following description covers a connection phase for the switch from the disconnected configuration into the connected configuration, with reference to FIGS. 9-15.

Figure 6:
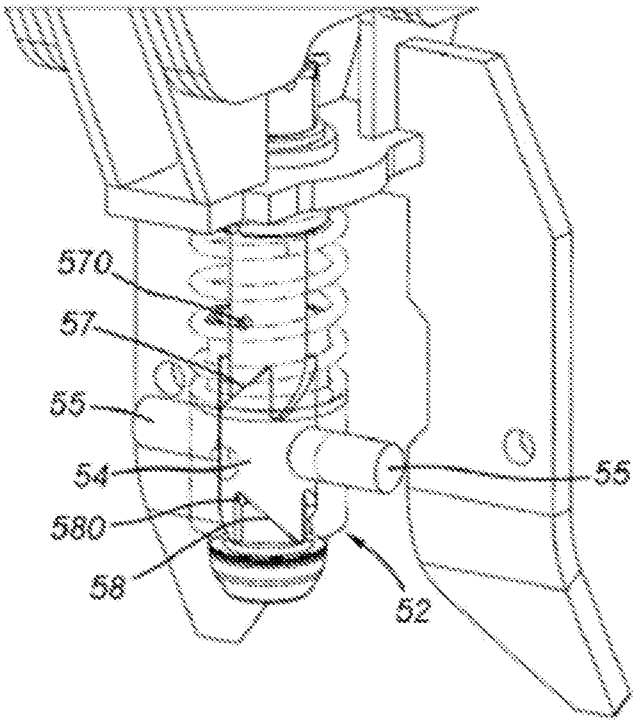
FIG. 6 is a schematic partial and perspective view of the upper reeve block, with some elements removed or in transparency and with the bolt in the unlocking state.
Figure 7:
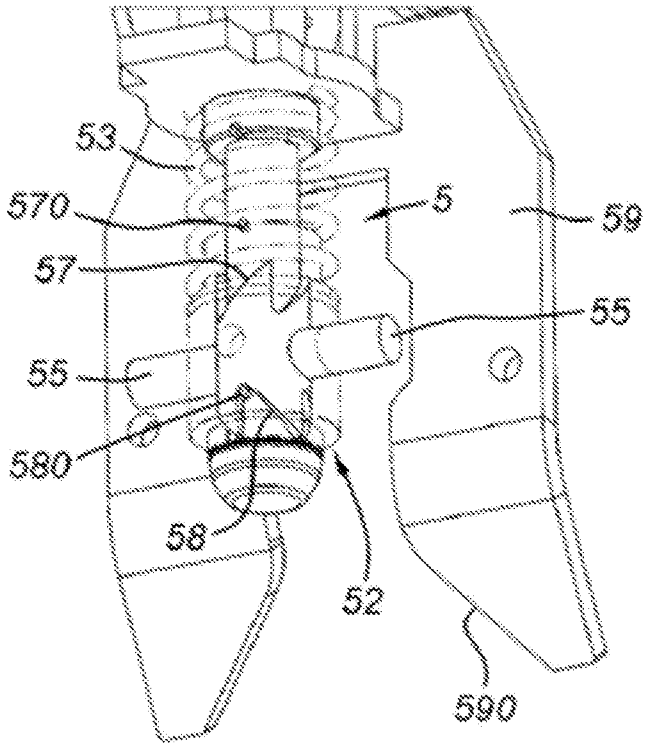
FIG. 7 is a schematic partial and perspective view of the upper reeve block, with some elements removed or in transparency and with the bolt in the unlocking state, at another viewpoint different from FIG. 6.
Figure 9:
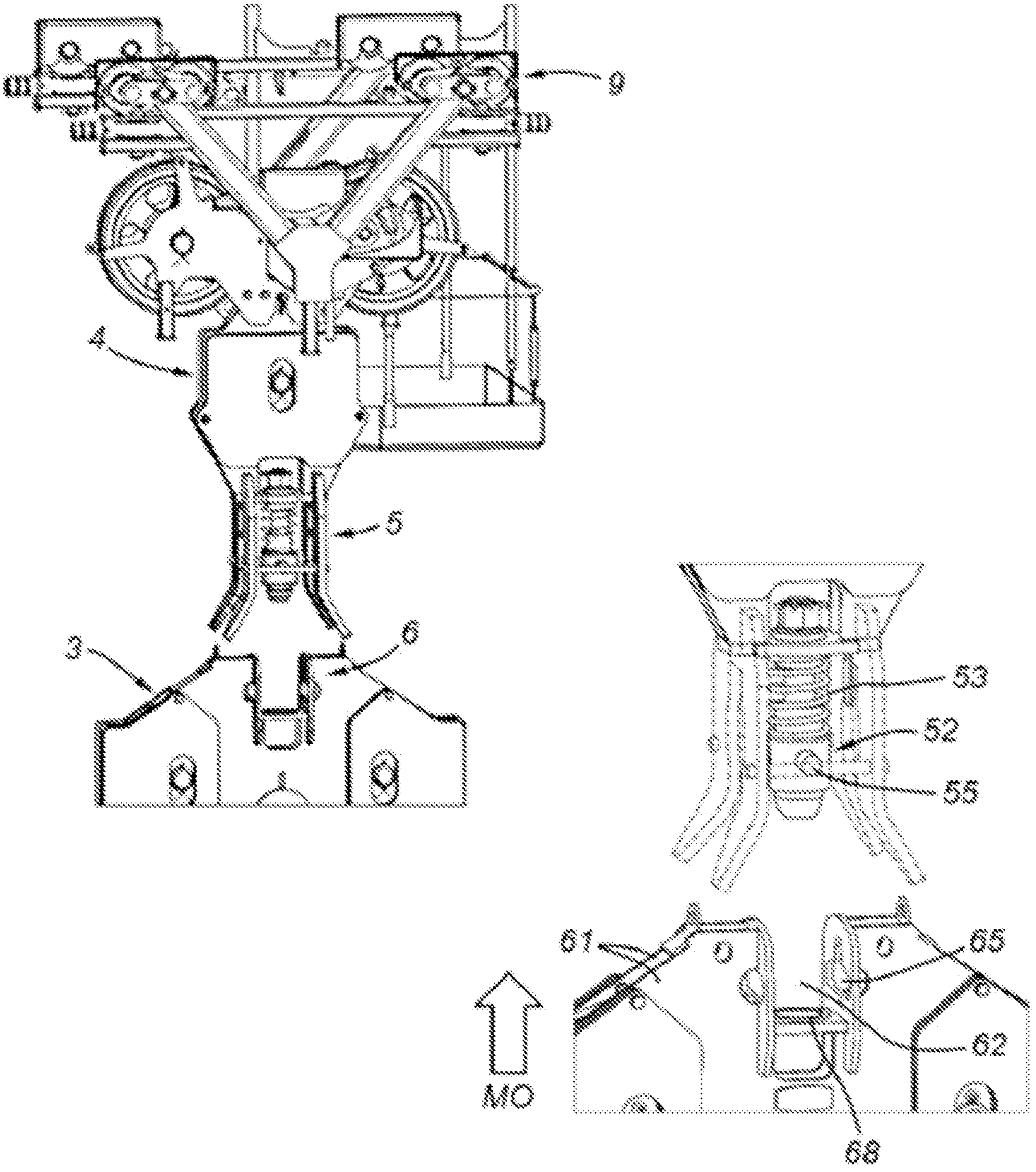
FIG. 9 is a schematic partial and perspective view of the double-reeved lifting device of FIG. 1, in a disconnected configuration, with an almost complete view to the left and a view zoomed on the reversible connection means to the right.

Referring to FIG. 9, in the disconnected configuration, the upper reeve block 4 hangs above the lower reeve block 3, with the upper reeve block 4 at the high stop on the jib. In this disconnected configuration, the bolt 52 is in its unlocking state, by the action of the elastic biasing element 53, with the distal dowel pins 580 which are at the bottom of the distal ramps 58, and with the proximal dowel pins 570 which are away and in front of the ridges of the proximal ramps 57 (as shown in FIGS. 6 and 7).

To switch from the disconnected configuration into the connected configuration, the lower reeve block 3 begins by being raised, as schematized by the arrow MO, for a relative approach between the two reeve blocks 3, 4, until the stop 51 fits inside the opening 67 provided in the bottom wall 66 (as shown in FIG. 10) and afterwards the distal end 521 of the bolt 52 abuts against the periphery of the opening 67 forming the catch 68 and thus the bolt 52 slides in the first sliding direction (sliding upwards in the illustrated example) by the effect of the push exerted by the catch 68.

Figure 11:
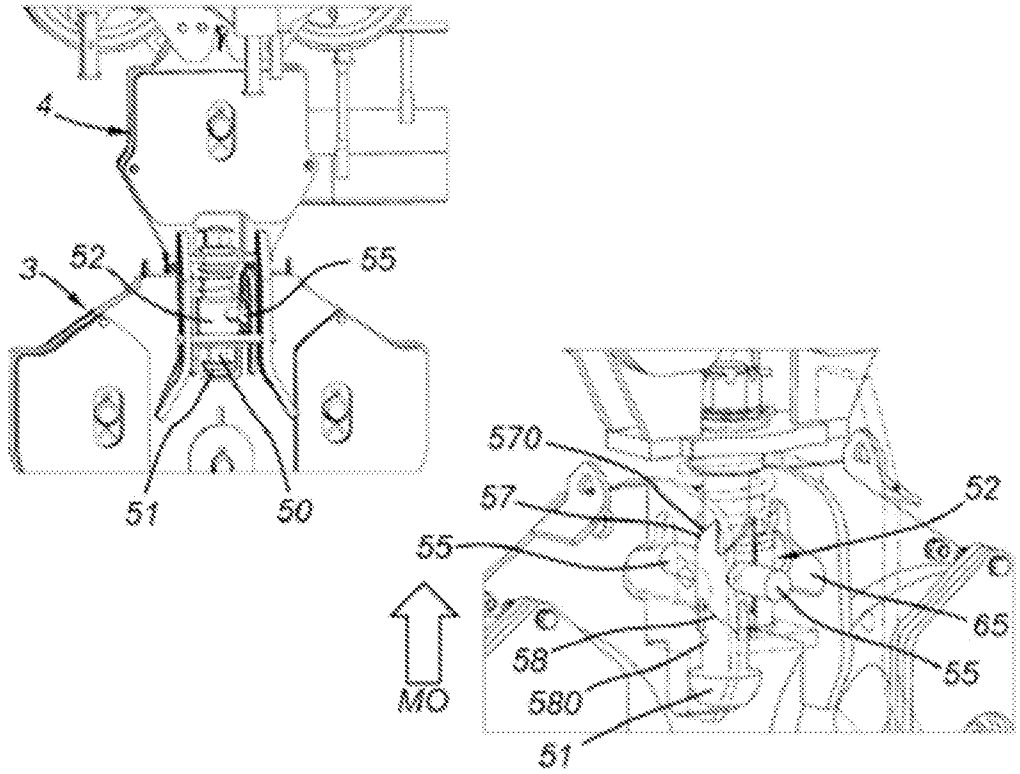
FIG. 11 is a schematic view equivalent to that of FIGS. 9 and 10, at the middle of the first step of the disconnection phase, while the lower reeve block continues its rise so that the bolt starts its first rotation.
Figure 12:
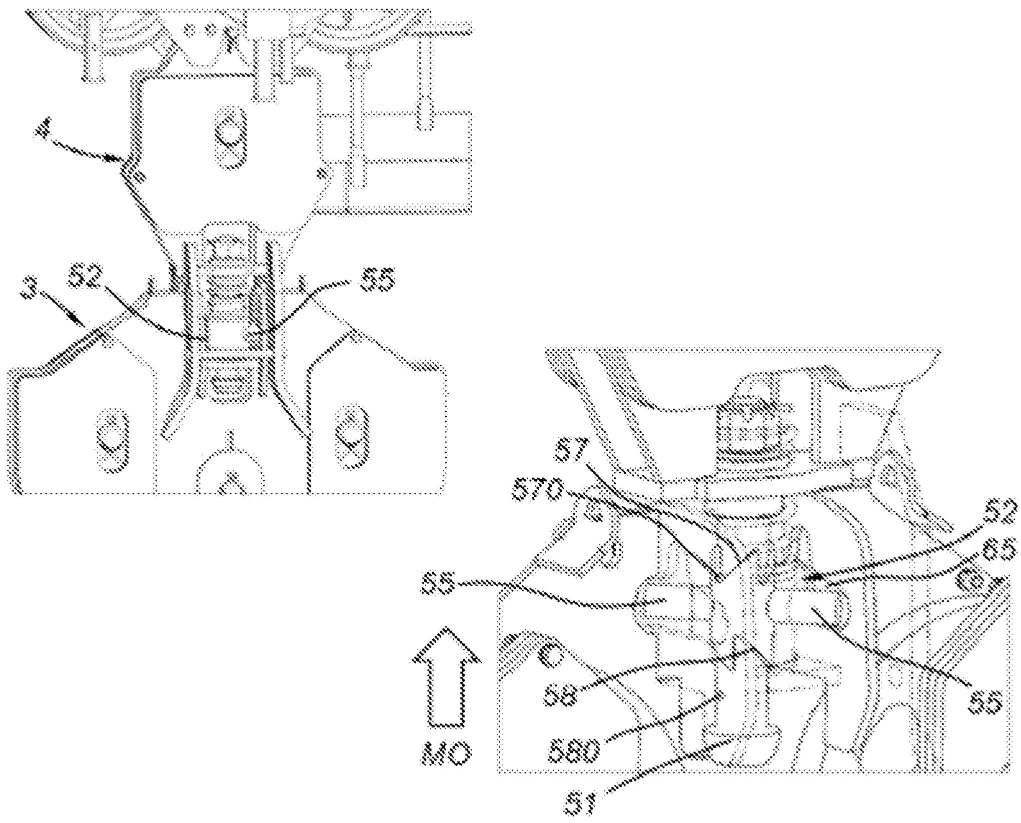
FIG. 12 is a schematic view equivalent to that of FIGS. 9-11, at the end of the first step of the disconnection phase, while the lower reeve block finishes its rise so that the bolt terminates its first rotation.

Because of this sliding of the bolt 52 in the first sliding direction, the distal ramps 58 leave contact with the distal dowel pins 580 and, on the contrary, the proximal ramps 57 come into contact with the proximal dowel pins 570, thereby making the bolt 52 pivot into the first rotation of 45 degree, as shown in FIGS. 11 and 12. At the end of this first rotation, the proximal dowel pins 570 are at the bottom of the proximal ramps 57 and the distal dowel pins 580 are away and in front of the ridges of the distal ramps 58.

Figure 13:
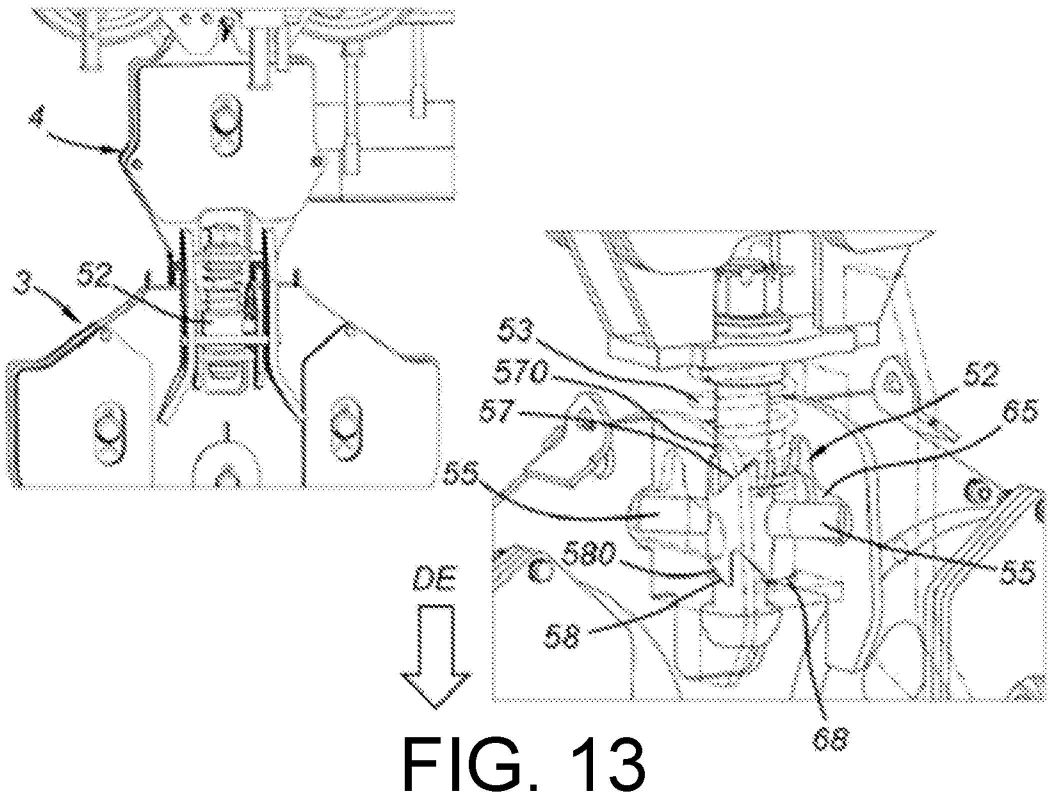
FIG. 13 is a schematic view equivalent to that of FIGS. 9-12, during a second step of the disconnection phase which follows the first step of FIGS. 10-12, during which the lower reeve block starts descending.

Referring to FIG. 13, the lower reeve block 3 is then displaced in descent, as schematized by the arrow DE, so that the catch 68 descends with the lower reeve block 68, which enables the elastic biasing element 53 to make the bolt 52 slide in the second sliding direction (sliding downwards in the illustrated example).

Figure 5:
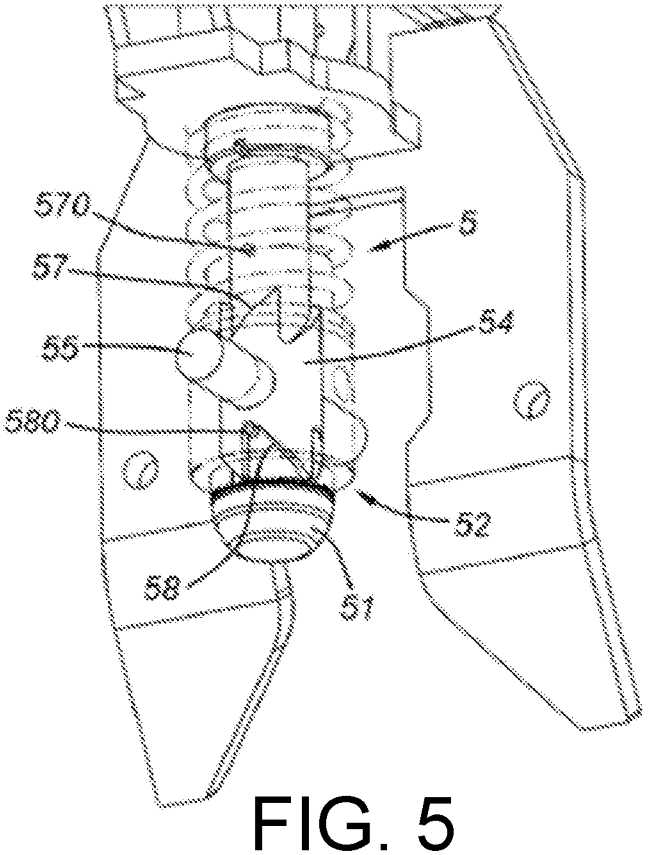
FIG. 5 is a schematic partial and perspective view of the upper reeve block, with some elements removed or in transparency and with the bolt in the locking state, at another viewpoint different from FIGS. 3 and 4.
Figure 14:
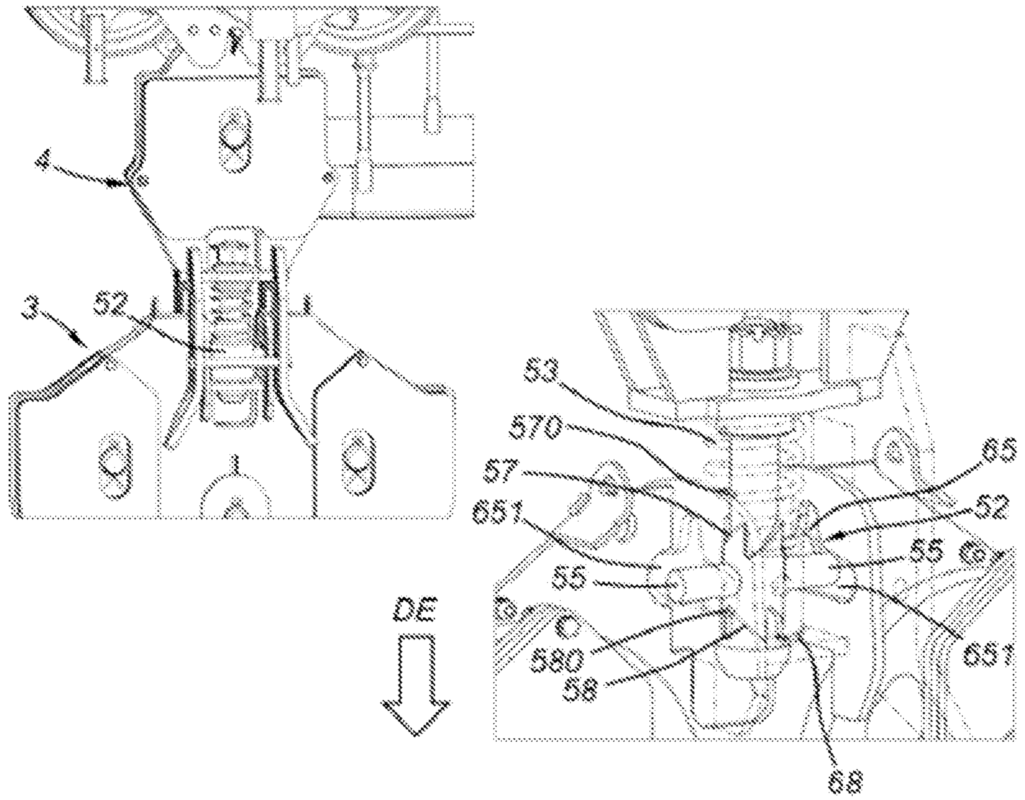
FIG. 14 is a schematic view equivalent to that of FIGS. 9-13, at the middle of the second step of the disconnection phase, while the lower reeve block continues its descent so that the bolt performs its second rotation and thus reaches its locking state in the first oblong sections of the striker orifices.

Because of this sliding of the bolt 52 in the second sliding direction, the proximal ramps 57 leave contact with the proximal dowel pins 570 and, on the contrary, the distal ramps 58 come into contact with the distal dowel pins 580, thereby making the bolt 52 pivot into the second rotation of 45 degree, as shown in FIGS. 13 and 14. At the end of this second rotation, the distal dowel pins 580 are at the bottom of the distal ramps 58 and the proximal dowel pins 570 are away and in front of the ridges of the proximal ramps 57 (as illustrated in FIG. 5), and also the locking fingers 55 fit inside the first oblong sections 651 of the respective striker orifices 65; the bolt 52 then being in its locking state.

Figure 15:
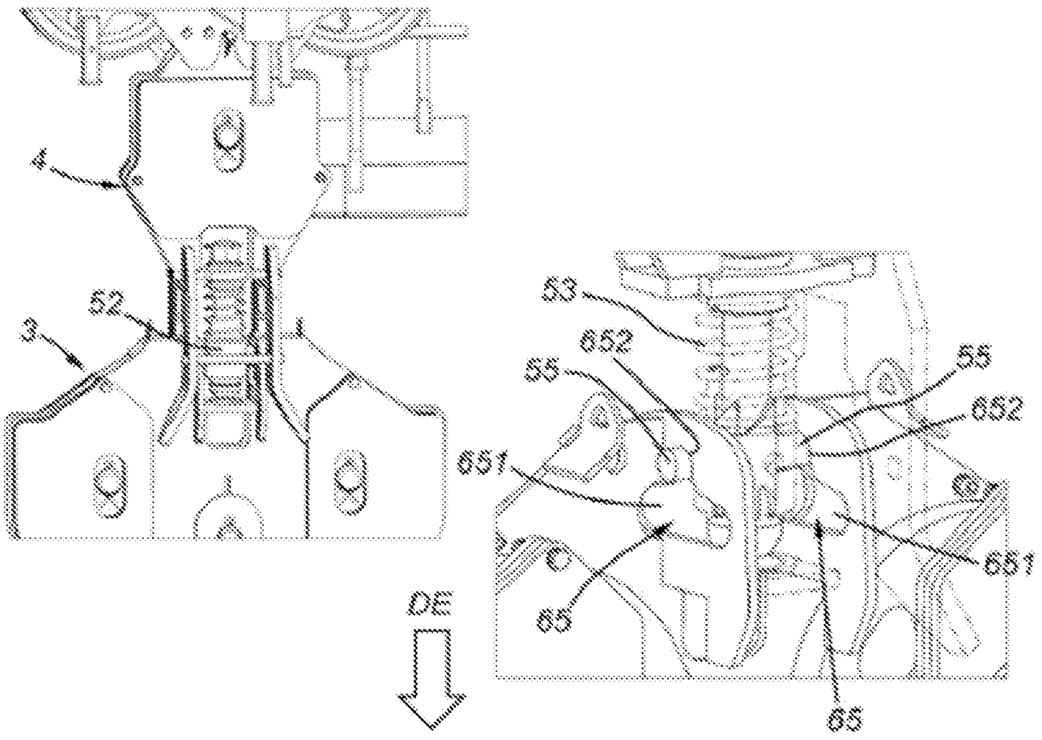
FIG. 15 is a schematic view equivalent to that of FIGS. 9-14, at the end of the second step of the disconnection phase, while the lower reeve block finishes its descent so that the bolt rises in the second oblong sections of the striker orifices, thereby completing the connection between the reeve blocks.

Referring to FIG. 15, the lower reeve block 3 continues to be displaced in descent, as schematized by the arrow DE, until the locking fingers 55 also fit inside the second oblong sections 652 of the respective striker orifices 65, and thus the lower reeve block 3 and the upper reeve block 4 are connected, and then the lower reeve block 3 could continue its descent with the upper reeve block 4 in the connected configuration.

The following description covers a connection phase for switching from the connected configuration into the disconnected configuration.

To switch from the connected configuration into the disconnected configuration, the lower reeve block 3 is first raised (with the upper reeve block 4), until the upper reeve block 4 reaches the high stop on the jib, and more specifically until the upper stop 43 of the upper reeve block 4 abuts against the dispensing carriage 9, with its upper stop 43 fitted into the slot 90 provided on the underside of the dispensing carriage 9. It should be noted that the bolt 52 is in its locking state, with the locking fingers 55 which fit inside the second oblong sections 652 of the respective striker orifices 65.

Once the upper reeve block 4 is at the high stop, the lower reeve block 3 continues rising, while the upper reeve block 4 is blocked, so that the locking fingers 55 reach the first oblong sections 651 of the respective striker orifices 65, afterwards the stop 51 fits inside the opening 67 provided in the bottom wall 66 and afterwards the distal end 521 of the bolt 52 abuts against the periphery of the opening forming the catch 68 and thus the bolt 52 slides in the first sliding direction (sliding upwards in the illustrated example) by the effect of the push exerted by the catch 68.

This sliding of the bolt 52 in the first sliding direction leads to the first rotation of the bolt 52 by 45 degrees, as already described by the sliding contact between the proximal ramps 57 and the proximal dowel pins 570.

In a second step, the lower reeve block 3 is displaced in descent, so that the catch 68 descends with the lower reeve block 3, which enables the elastic biasing element 53 to make the bolt 52 slide in the second sliding directions.

This sliding of the bolt 52 in the second sliding direction leads to the second rotation of the bolt 52 by 45 degrees, as already described by the sliding contact between the distal ramps 58 and the distal dowel pins 580.

At the end of these two 45 degree rotations, the locking fingers 55 have pivoted by 90 degrees and have completely cleared the respective striker orifices 65; the bolt 52 then being in its unlocking state. Thus, the lower reeve block 3 and the upper reeve block 4 are disconnected, and then the lower reeve block 3 could continue its descent alone in the disconnected configuration, without the upper reeve block 4 which remains at the level of the dispensing carriage 9.

Thus, it should be noted that, in the connection phase and in the disconnection phase, only the control of the ascending/descending movements of the lower reeve block 3 allows switching from a connected configuration into the disconnected configuration, and vice versa. The control of the ascending/descending movements of the lower reeve block 3 is performed by controlling the lifting winch.

Also, it may be advantageous to automate the displacements of the lower reeve block 3, in the connection phase and in the disconnection phase, by means of a monitoring/control unit which drives the lifting winch. In this context of an automation of the connection and disconnection phases, it may be advantageous to provide for one or several sensor(s) allowing detecting relative positions between the lower reeve block 3 and the upper reeve block 4, such as for example a sensor allowing detecting when the upper reeve block 4 is at the high stop on the jib, and more specifically when the upper stop 43 of the upper reeve block 4 abuts against the dispensing carriage 9. Indeed, this position represents a starting point of the movements that will follow in the connection and disconnection phases.

Moreover, it could be considered to reverse the positions of the locking mechanism 5 and of the complementary locking structure 6 of the reversible connection means, by arranging the locking mechanism 5 on the lower reeve block 3 and by arranging the complementary locking structure 6 on the upper reeve block 4. It is also possible to operate with one single rotation of the bolt 52 for the locking mechanism 5. Alternatively, it is possible to operate with other rotational amplitudes or directions of the bolt 52. It could also be considered to provide for an elastic biasing element 53 other than a spring, such as for example an elastic leaf, a return mechanism, or other equivalent means.

The invention claimed is:

1. A double-reeved lifting device for a lifting machinery, the lifting device comprising two reeve blocks including a lower reeve block secured to a lifting hook and an upper reeve block, wherein the two reeve blocks comprise reversible connection means adapted to be reversibly configured between:

a connected configuration in which the upper reeve block is connected to the lower reeve block so as to be able to accompany the lower reeve block in ascending/descending movements, and a disconnected configuration in which the upper reeve block is disconnected from the lower reeve block so as to be able to remain hanging above the lower reeve block such that the lower reeve block is configured to perform descending/ascending movements without the upper reeve block, wherein the connected configuration and the disconnected configuration respectively correspond to a double-reeved configuration and to a simple-reeved configuration, or vice versa, of the double-reeved lifting device, wherein the reversible connection means comprise a locking mechanism mounted on one of the two reeve blocks, and a complementary locking structure mounted on the other one of the two reeve blocks and adapted to cooperate with the locking mechanism;

wherein the complementary locking structure comprises a set forming a striker having at least one striker orifice, and the locking mechanism comprises a bolt mounted slidably movable along a spindle along a main axis and comprising at least one locking finger, wherein the bolt is also pivotally movable around the spindle and the main axis between:

a locking state, applied in the connected configuration, with the at least one locking finger inside the at least one striker orifice, and an unlocking state, applied in the disconnected configuration, with the at least one locking finger out of the at least one striker orifice so as to enable a relative approach and a relative distancing between the two reeve blocks, and wherein the locking mechanism and the complementary locking structure comprise respective guide elements cooperating together so as to convert a relative approach and a relative distancing between the two reeve blocks into concomitant slidings and rotations of the bolt, wherein the complementary locking structure comprises a catch against which the bolt is configured to abut during a relative approach between the two reeve blocks for a sliding of the bolt in a first sliding direction, and the locking mechanism comprises an elastic biasing element, urging the bolt to slide in a second sliding direction, opposite to the first sliding direction, wherein the respective guide elements comprise complementary guide elements provided on the locking mechanism so as to cooperate in sliding bearing in order to convert a sliding of the bolt in the first sliding direction into a concomitant first rotation of the bolt, and a sliding of the bolt in the second sliding direction into a concomitant second rotation of the bolt, and wherein the concomitant first rotation and the concomitant second rotation are performed in a same rotational direction.

2. The double-reeved lifting device according to claim 1, wherein the at least one locking finger extends orthogonally to the main axis, and the at least one striker orifice comprises a first oblong section along a direction perpendicular to the main axis and perpendicular to the at least one locking finger in the locking state.

3. The double-reeved lifting device according to claim 2, wherein the at least one striker orifice comprises a second oblong section along a direction parallel to the main axis, disposed at the middle of the first oblong section.

4. A double-reeved lifting device for a lifting machinery, the lifting device comprising two reeve blocks including a lower reeve block secured to a lifting hook and an upper reeve block, wherein the two reeve blocks comprise reversible connection means adapted to be reversibly configured between:

a connected configuration in which the upper reeve block is connected to the lower reeve block so as to be able to accompany the lower reeve block in ascending/descending movements, and a disconnected configuration in which the upper reeve block is disconnected from the lower reeve block so as to be able to remain hanging above the lower reeve block such that the lower reeve block is configured to perform descending/ascending movements without the upper reeve block, wherein the connected configuration and the disconnected configuration respectively correspond to a double-reeved configuration and to a simple-reeved configuration, or vice versa, of the double-reeved lifting device, wherein the reversible connection means comprise a locking mechanism mounted on one of the two reeve blocks, and a complementary locking structure mounted on the other one of the two reeve blocks and adapted to cooperate with the locking mechanism;

wherein the complementary locking structure comprises a set forming a striker having at least one striker orifice, and the locking mechanism comprises a bolt mounted slidably movable along a spindle along a main axis and comprising at least one locking finger, wherein the bolt is also pivotally movable around the spindle and the main axis between:

a locking state, applied in the connected configuration, with the at least one locking finger inside the at least one striker orifice, and an unlocking state, applied in the disconnected configuration, with the at least one locking finger out of the at least one striker orifice so as to enable a relative approach and a relative distancing between the two reeve blocks, and wherein the locking mechanism and the complementary locking structure comprise respective guide elements cooperating together so as to convert a relative approach and a relative distancing between the two reeve blocks into concomitant slidings and rotations of the bolt, wherein the complementary locking structure comprises a catch against which the bolt is configured to abut during a relative approach between the two reeve blocks for a sliding of the bolt in a first sliding direction, and the locking mechanism comprises an elastic biasing element, urging the bolt to slide in a second sliding direction, opposite to the first sliding direction, wherein the respective guide elements comprise complementary guide elements provided on the locking mechanism so as to cooperate in sliding bearing in order to convert a sliding of the bolt in the first sliding direction into a concomitant first rotation of the bolt, and a sliding of the bolt in the second sliding direction into a concomitant second rotation of the bolt, and wherein a sequence of the concomitant first rotation and of the concomitant second rotation leads to an overall rotation of the bolt at an overall angular amplitude that is equivalent to 90 degrees or to 90 degrees plus N times 180 degrees, N being an integer other than zero.

5. The double-reeved lifting device according to claim 4, wherein the concomitant first rotation is performed at a first angular amplitude and the concomitant second rotation is performed at a second angular amplitude, wherein each of the first angular amplitude and the second angular amplitude are equivalent to 45 degrees.

6. A double-reeved lifting device for a lifting machinery, the lifting device comprising two reeve blocks including a lower reeve block secured to a lifting hook and an upper reeve block, wherein the two reeve blocks comprise reversible connection means adapted to be reversibly configured between:

a connected configuration in which the upper reeve block is connected to the lower reeve block so as to be able to accompany the lower reeve block in ascending/descending movements, and a disconnected configuration in which the upper reeve block is disconnected from the lower reeve block so as to be able to remain hanging above the lower reeve block such that the lower reeve block is configured to perform descending/ascending movements without the upper reeve block, wherein the connected configuration and the disconnected configuration respectively correspond to a double-reeved configuration and to a simple-reeved configuration, or vice versa, of the double-reeved lifting device, wherein the reversible connection means comprise a locking mechanism mounted on one of the two reeve blocks, and a complementary locking structure mounted on the other one of the two reeve blocks and adapted to cooperate with the locking mechanism;

wherein the complementary locking structure comprises a set forming a striker having at least one striker orifice, and the locking mechanism comprises a bolt mounted slidably movable along a spindle along a main axis and comprising at least one locking finger, wherein the bolt is also pivotally movable around the spindle and the main axis between:

a locking state, applied in the connected configuration, with the at least one locking finger inside the at least one striker orifice, and an unlocking state, applied in the disconnected configuration, with the at least one locking finger out of the at least one striker orifice so as to enable a relative approach and a relative distancing between the two reeve blocks, and wherein the locking mechanism and the complementary locking structure comprise respective guide elements cooperating together so as to convert a relative approach and a relative distancing between the two reeve blocks into concomitant slidings and rotations of the bolt, wherein the complementary locking structure comprises a catch against which the bolt is configured to abut during a relative approach between the two reeve blocks for a sliding of the bolt in a first sliding direction, and the locking mechanism comprises an elastic biasing element, urging the bolt to slide in a second sliding direction, opposite to the first sliding direction, wherein the respective guide elements comprise complementary guide elements provided on the locking mechanism so as to cooperate in sliding bearing in order to convert a sliding of the bolt in the first sliding direction into a concomitant first rotation of the bolt, and a sliding of the bolt in the second sliding direction into a concomitant second rotation of the bolt, and wherein the locking mechanism comprises:

the spindle extending along the main axis and provided with a free end having a stop for the bolt;

the bolt mounted rotatably and slidably movable around the spindle along the main axis, the bolt comprising the at least one locking finger extending transversely with respect to the main axis, wherein the bolt has a distal end facing the stop, and a proximal end opposite to the distal end; and the elastic biasing element mounted on the spindle and bearing on the proximal end of the bolt to slidably urge it in the direction of the stop in the second sliding direction;

wherein the complementary locking structure comprises a locking housing in which are provided:

the catch against which the distal end of the bolt is configured to abut upon a relative approach between the two reeve blocks, urging the bolt to slide in the direction of at least one complementary proximal guide element in the first sliding direction, against the elastic biasing element; and the set forming the striker having the at least one striker orifice; and wherein the complementary guide elements comprise:

at least one proximal guide element provided on the proximal end of the bolt and the at least one complementary proximal guide element provided on the spindle so as to cooperate in sliding bearing with the at least one proximal guide element in order to convert a sliding of the bolt in the direction of the at least one complementary proximal guide element in the first sliding direction into the concomitant first rotation of the bolt, upon a relative approach between the two reeve blocks;

at least one distal guide element provided on the distal end of the bolt and at least one complementary distal guide element provided on the spindle so as to cooperate in sliding bearing with the at least one distal guide element in order to convert a displacement of the bolt in the direction of the stop and of the at least one complementary distal guide element in the second sliding direction into the concomitant second rotation of the bolt, by the effect of the elastic biasing element upon a relative distancing between the two reeve blocks.

7. The double-reeved lifting device according to claim 6, wherein the locking housing has a bottom wall in which an opening is formed for the passage of the free end of the spindle and of its stop, the opening being delimited by a periphery forming the catch.

8. The double-reeved lifting device according to claim 6, wherein the set forming the striker comprises at least one lateral flange delimiting the locking housing and in which the at least one striker orifice is provided.

9. The double-reeved lifting device according to claim 8, wherein the at least one locking finger of the bolt comprises two locking fingers, diametrically opposite one another with respect to the main axis, and the at least one lateral flange of the set forming the striker comprises two lateral flanges facing each other, disposed on either side of the catch, and in which two respective striker orifices are provided facing each other, wherein the at least one striker orifice comprises the two respective striker orifices.

10. The double-reeved lifting device according to claim 6, wherein the bolt comprises:

an inner part mounted around the spindle and on which the at least one distal guide element and the at least one proximal guide element are provided; and an outer sleeve which surrounds the inner part and from which the at least one locking finger projects, wherein the elastic biasing element bears on said outer sleeve.

11. The double-reeved lifting device according to claim 10, wherein the at least one locking finger is fastened to the inner part and crosses the outer sleeve.

12. The double-reeved lifting device according to claim 6, wherein the at least one proximal guide element comprises several proximal ramps successively distributed around the main axis on the proximal end of the bolt, and the at least one complementary proximal guide element comprises one or several proximal dowel pin(s) projecting radially on the spindle in order to slidably bear on one of the several proximal ramps.

13. The double-reeved lifting device according to claim 12, wherein the at least one distal guide element comprises several distal ramps successively distributed around the main axis on the proximal end of the bolt, and the at least one complementary distal guide element comprises one or several distal dowel pin(s) projecting radially on the spindle in order to slidably bear on one of the several distal ramps, and wherein the several proximal ramps and the several distal ramps are inclined in opposite directions around the main axis, so that the concomitant first rotation and the concomitant second rotation of the bolt is performed in a same rotational direction, during the conversions of the slidings of the bolt in the first sliding direction and the second sliding direction respectively.

14. The double-reeved lifting device according to claim 6, wherein the at least one distal guide element comprises several distal ramps successively distributed around the main axis on the proximal end of the bolt, and the at least one complementary distal guide element comprises one or several distal dowel pin(s) projecting radially on the spindle in order to slidably bear on one of the several distal ramps.

15. A lifting machinery comprising:

a jib; and a double-reeved lifting device comprising two reeve blocks including a lower reeve block secured to a lifting hook and an upper reeve block, wherein the two reeve blocks comprise reversible connection means adapted to be reversibly configured between:

a connected configuration in which the upper reeve block is connected to the lower reeve block so as to be able to accompany the lower reeve block in ascending/descending movements, and a disconnected configuration in which the upper reeve block is disconnected from the lower reeve block so as to be able to remain hanging above the lower reeve block such that the lower reeve block is configured to perform descending/ascending movements without the upper reeve block, wherein the connected configuration and the disconnected configuration respectively correspond to a double-reeved configuration and to a simple-reeved configuration, or vice versa, of the double-reeved lifting device, wherein the reversible connection means comprise a locking mechanism mounted on one of the two reeve blocks, and a complementary locking structure mounted on the other one of the two reeve blocks and adapted to cooperate with the locking mechanism;

wherein the complementary locking structure comprises a set forming a striker having at least one striker orifice, and the locking mechanism comprises a bolt mounted slidably movable along a spindle along a main axis and comprising at least one locking finger, wherein the bolt is also pivotally movable around the spindle and the main axis between:

a locking state, applied in the connected configuration, with the at least one locking finger inside the at least one striker orifice, and an unlocking state, applied in the disconnected configuration, with the at least one locking finger out of the at least one striker orifice so as to enable a relative approach and a relative distancing between the two reeve blocks, and wherein the locking mechanism and the complementary locking structure comprise respective guide elements cooperating together so as to convert a relative approach and a relative distancing between the two reeve blocks into concomitant slidings and rotations of the bolt, the double-reeved lifting device formed so as to lift/lower a load along the jib, wherein the lower reeve block hangs from the jib by a lifting rope connected to a lifting winch to make the lower reeve block ascend/descend, the lifting rope passing through the upper reeve block, and wherein:

starting from the disconnected configuration with the upper reeve block hanging above the lower reeve block and with the bolt in the unlocking state, the lower reeve block is configured to be displaced so that the respective guide elements cooperate together so as to make the bolt slide and pivot concomitantly in order to set the bolt into the locking state to reach the connected configuration; and starting from the connected configuration with the bolt in the locking state, the lower reeve block could be displaced so that the respective guide elements cooperate together so as to make the bolt slide and pivot concomitantly in order to set the bolt into the unlocking state to reach the disconnected configuration, wherein the complementary locking structure comprises a catch against which the bolt is configured to abut during a relative approach between the two reeve blocks for a sliding of the bolt in a first sliding direction, and the locking mechanism comprises an elastic biasing element, urging the bolt to slide in a second sliding direction, opposite to the first sliding direction, wherein the respective guide elements comprise complementary guide elements provided on the locking mechanism so as to cooperate in sliding bearing in order to convert a sliding of the bolt in the first sliding direction into a concomitant first rotation of the bolt, and a sliding of the bolt in the second sliding direction into a concomitant second rotation of the bolt, and starting from the disconnected configuration, the lower reeve block is configured to be raised for a relative approach between the two reeve blocks until the upper reeve block reaches a high stop on the jib and the bolt abuts against the catch in order to make the bolt slide in the first sliding direction and make the bolt pivot concomitantly into the concomitant first rotation of the bolt, and then the lower reeve block could be lowered so that the bolt slides in the second sliding direction urged by the elastic biasing element and concomitantly pivots into the concomitant second rotation of the bolt, thereby setting the bolt in the locking state; and starting from the connected configuration, the lower reeve block is configured to be raised until the upper reeve block reaches the high stop on the jib and the bolt abuts against the catch in order to make the bolt slide in the first sliding direction and make it pivot concomitantly into the concomitant first rotation of the bolt, and then the lower reeve block is configured to be lowered so that the bolt slides in the second sliding direction urged by the elastic biasing element and concomitantly pivots into the concomitant second rotation of the bolt, thereby setting the bolt in the unlocking state.

16. The lifting machinery according to claim 15, comprising a dispensing carriage movably mounted on the jib and linked to a dispensing system adapted to displace the dispensing carriage along the jib in opposite forward direction and backward direction, and wherein the lower reeve block hangs from the dispensing carriage by the lifting rope.

17. A lifting method for lifting a load by using the lifting machinery according to claim 16, the method, comprising:

a connection phase for a switch from the disconnected configuration into the connected configuration, during which the lower reeve block is displaced so that the respective guide elements cooperate together to make the bolt slide and pivot concomitantly in order to set it in the locking state to reach the connected configuration; and a disconnection phase for a switch from the connected configuration into the disconnected configuration, during which the lower reeve block is displaced so that the respective guide elements cooperate together so as to make the bolt slide and pivot concomitantly in order to set it in the unlocking state to reach the disconnected configuration.

18. The lifting method according to claim 17, wherein:

in the connection phase, the lower reeve block is raised for a relative approach between the two reeve blocks until the upper reeve block reaches the high stop on the jib and the bolt abuts against the catch in order to make the bolt slide in the first sliding direction and make it pivot concomitantly into the first rotation of the bolt, and then said lower reeve block is lowered so that said bolt slides in the second sliding direction urged by the elastic biasing element and concomitantly pivots into the concomitant second rotation of the bolt, thereby setting the bolt in the locking state; and in the disconnection phase, the lower reeve block is raised until the upper reeve block reaches the high stop on the jib and the bolt abuts against the catch in order to make the bolt slide in the first sliding direction and make it pivot concomitantly into the concomitant first rotation of the bolt, and then said lower reeve block is lowered so that said bolt slides in the second sliding direction urged by the elastic biasing element and concomitantly pivots into the second rotation of the bolt, thereby setting the bolt in the unlocking state.

19. The lifting method according to claim 17, wherein the displacements of the lower reeve block, in the connection phase and in the disconnection phased, are automated.

* * * * *